US010816120B2

(12) United States Patent
Burns (10) Patent No.: US 10,816,120 B2
(45) Date of Patent: Oct. 27, 2020

(54) FAUCET WITH INTEGRATED PUSH-TO-CONNECT FITTING

(71) Applicant: Reliance Worldwide Corporation, Atlanta, GA (US)

(72) Inventor: William J Burns, South Victoria (AU)

(73) Assignee: Reliance Worldwide Corporation, Atlanta, GA (US)

( * ) Notice: Subject to any disclaimer, the term of this patent is extended or adjusted under 35 U.S.C. 154(b) by 0 days.

(21) Appl. No.: 15/843,186

(22) Filed: Dec. 15, 2017

(65) Prior Publication Data

US 2019/0186642 A1    Jun. 20, 2019

(51) Int. Cl.
| | | |
|---|---|---|
| *F16L 37/091* | (2006.01) | |
| *E03C 1/02* | (2006.01) | |
| *F16K 1/04* | (2006.01) | |
| *B21K 1/24* | (2006.01) | |
| *F16L 37/02* | (2006.01) | |

(Continued)

(52) U.S. Cl.
CPC ............ *F16L 37/0915* (2016.05); *B21K 1/24* (2013.01); *E03C 1/021* (2013.01); *F16K 1/04* (2013.01); *F16K 1/10* (2013.01); *F16K 1/32* (2013.01); *F16K 1/487* (2013.01); *F16K 5/06* (2013.01); *F16K 5/0689* (2013.01); *F16K 27/02* (2013.01); *F16K 31/60* (2013.01); *F16L 37/025* (2013.01)

(58) Field of Classification Search
CPC . F16L 37/0915; F16L 37/091; F16L 37/0925; F16L 37/025; F16K 1/02; F16K 1/04; F16K 1/06; F16K 1/08; F16K 1/10; F16K 1/48; F16K 1/482; F16K 1/485; F16K 1/487; F16K 27/02; F16K 31/50; E03C 1/021; B21K 1/20; B21K 1/24
See application file for complete search history.

(56) References Cited

U.S. PATENT DOCUMENTS

| 1,115,696 A | 11/1914 | Linbarger |
| 1,214,220 A | 1/1917 | Regar |

(Continued)

FOREIGN PATENT DOCUMENTS

| CN | 204277132 U | 4/2015 | |
| WO | WO-2015125386 A1 * | 8/2015 | .......... F16L 37/0915 |

OTHER PUBLICATIONS

U.S. Appl. No. 29/710,473, filed Oct. 23, 2019, Burns, William.

(Continued)

*Primary Examiner* — David Colon-Morales
(74) *Attorney, Agent, or Firm* — Foley and Lardner LLP (57) ABSTRACT

A valve assembly includes a body having a fluid inlet disposed on a first end of the body and a fluid outlet disposed on a second end of the body in fluid connection with the fluid inlet. The valve assembly further includes a push-to-connect fitting which is integral to the body and configured to connect to an end of a pipe, a stem configured to seal the body in a first position and configured to allow fluid to flow from the fluid inlet of the body to the fluid outlet in a second position, and a connector surrounding at least part of the push-to-connect fitting. The body is configured to house a sealing ring. The push-to-connect fitting is configured to communicate the fluid inlet with the end of the pipe. The sealing ring secured by the push-to-connect fitting is configured to provide a seal between the fluid inlet and the end of the pipe.

10 Claims, 8 Drawing Sheets

(51) Int. Cl.
F16K 1/32 (2006.01)
F16K 27/02 (2006.01)
F16K 5/06 (2006.01)
F16K 31/60 (2006.01)
F16K 1/48 (2006.01)
F16K 1/10 (2006.01)

(56) References Cited

U.S. PATENT DOCUMENTS

| | | | |
|---|---|---|---|
| D52,919 S | 1/1919 | Mittinger | |
| 1,482,484 A | 2/1924 | Roberts | |
| 1,878,288 A * | 9/1932 | Mohr | F16K 27/02 |
| | | | 251/142 |
| 1,878,569 A | 9/1932 | Zolleis | |
| 1,939,911 A | 12/1933 | McCune | |
| 2,210,375 A | 8/1940 | Mueller | |
| 2,887,295 A * | 5/1959 | Bredtschneider | F16K 1/42 |
| | | | 251/359 |
| 2,997,054 A * | 8/1961 | Woodford | E03C 1/104 |
| | | | 137/218 |
| D205,438 S | 8/1966 | Hansen | |
| 3,414,001 A | 12/1968 | Woodford | |
| D223,647 S | 5/1972 | Cornelius | |
| 3,711,063 A | 1/1973 | Gibbs et al. | |
| 4,244,556 A * | 1/1981 | Miller | F16K 1/02 |
| | | | 251/118 |
| 4,523,740 A | 6/1985 | Paitchell | |
| 4,722,558 A * | 2/1988 | Badoureaux | F16L 37/091 |
| | | | 285/242 |
| 4,860,784 A * | 8/1989 | Petersen | F16K 1/02 |
| | | | 137/315.28 |
| 5,174,611 A * | 12/1992 | Byrd | F16L 33/227 |
| | | | 285/305 |
| 5,480,122 A * | 1/1996 | Barker | E03C 1/02 |
| | | | 137/614 |
| 5,482,329 A | 1/1996 | McCall et al. | |
| 5,551,735 A * | 9/1996 | Takayanagi | F16L 33/22 |
| | | | 285/243 |
| 5,588,681 A | 12/1996 | Parks | |
| 6,065,491 A * | 5/2000 | Rider | E03C 1/042 |
| | | | 137/359 |
| 6,216,722 B1 | 4/2001 | Solomon | |
| 6,378,910 B1 * | 4/2002 | Maiman | F16L 5/10 |
| | | | 137/359 |
| 6,382,592 B1 * | 5/2002 | Kim | F16K 1/04 |
| | | | 251/215 |
| 6,502,364 B2 * | 1/2003 | Richardson | E03C 1/021 |
| | | | 52/220.8 |
| D513,310 S | 12/2005 | Kulig | |
| 7,409,964 B2 * | 8/2008 | Hoeptner, III | F16K 1/04 |
| | | | 137/218 |
| 7,530,606 B1 * | 5/2009 | Yang | F16K 5/0626 |
| | | | 285/340 |
| 7,942,161 B2 * | 5/2011 | Crompton | E03C 1/042 |
| | | | 137/315.13 |
| 8,272,396 B2 * | 9/2012 | Brienza | E03C 1/021 |
| | | | 137/360 |
| 8,469,337 B1 * | 6/2013 | Hoeptner, III | F16K 1/04 |
| | | | 251/214 |
| 8,491,012 B2 * | 7/2013 | Lequere | F16L 37/0915 |
| | | | 285/340 |
| 9,228,681 B2 * | 1/2016 | Kluss | F16L 37/091 |
| 10,072,783 B2 * | 9/2018 | Gledhill | F16L 37/091 |
| D830,122 S | 10/2018 | Seiders et al. | |
| 10,214,883 B2 * | 2/2019 | Chapla | E03B 9/025 |
| D861,834 S | 10/2019 | Foster et al. | |
| D873,967 S | 1/2020 | Ozburn | |
| D884,125 S | 5/2020 | Morefield et al. | |
| D887,813 S | 6/2020 | Burns et al. | |
| 2002/0167164 A1 * | 11/2002 | Thomas | E03C 1/042 |
| | | | 285/46 |
| 2003/0057701 A1 * | 3/2003 | Koo | F16L 37/0915 |
| | | | 285/307 |
| 2004/0021120 A1 | 2/2004 | Turnau, III et al. | |
| 2008/0149873 A1 * | 6/2008 | Cimberio | F16K 5/0647 |
| | | | 251/149.6 |
| 2010/0072744 A1 * | 3/2010 | Xie | F16K 5/0626 |
| | | | 285/33 |
| 2011/0025054 A1 * | 2/2011 | Kluss | F16L 37/0915 |
| | | | 285/351 |
| 2011/0140417 A1 * | 6/2011 | Kluss | B25B 27/10 |
| | | | 285/345 |
| 2012/0074695 A1 * | 3/2012 | Salehi-Bakhtiari | |
| | | | F16L 37/0915 |
| | | | 285/377 |
| 2014/0062078 A1 * | 3/2014 | Weissmann | F16L 13/116 |
| | | | 285/80 |
| 2014/0182709 A1 | 7/2014 | Janousek | |
| 2015/0345683 A1 | 12/2015 | Crompton et al. | |
| 2016/0033065 A1 * | 2/2016 | Graham | F16L 37/091 |
| | | | 285/335 |
| 2017/0307119 A1 * | 10/2017 | Taniguchi | F16K 27/00 |
| 2017/0321827 A1 * | 11/2017 | Lee | E03C 1/042 |
| 2018/0266604 A1 * | 9/2018 | Yang | F16K 27/02 |
| 2018/0291597 A1 * | 10/2018 | Hunt | E03C 1/042 |

OTHER PUBLICATIONS

U.S. Appl. No. 16/663,123, filed Oct. 24, 2019, Burns, William.
Non-Final Office Action in U.S. Appl. No. 16/663,123 dated Feb. 10, 2020.
Notification of Transmittal of the International Search Report and the Written Opinion of the International Searching Authority regarding PCT/US2018/65661 dated Mar. 22, 2019.
Notice of Allowance on U.S. Appl. No. 16/663,123 dated Jun. 17, 2020 (10 pages).
US Office Action on U.S. Appl. No. 29/710,473 dated Jun. 12, 2020 (7 pages).
U.S. Notice of Allowance on U.S. Appl. No. 29/710,473 dated Aug. 26, 2020 (6 pages).

* cited by examiner

FAUCET WITH INTEGRATED PUSH-TO-CONNECT FITTING

FIELD

The present disclosure relates generally to the field of valves for use in directing fluid flow for a fluid service.

BACKGROUND

During construction of a building (e.g., a house), the plumbing set-up for the building includes providing piping (such as a water pipe) to a location out of a wall where a fluid service will be provided. Typically, an installer will position and install a valve (e.g., a sillcock) on the pipe, for example, by screwing the valve onto an end of the pipe. In order for the valve to correctly function, the valve must be properly dimensioned and located on the end of the pipe such that an end of the valve presses tight against the siding or wall of the building, so as to secure the valve to the wall of the building, to prevent the valve from falling off the wall, and to prevent fluid leakage.

Additionally, if the end of the pipe is cut too short prior to installing the valve, the valve and/or pipe will leak. If installation of the valve is performed incorrectly, then additional time and material expenses will be incurred to rectify the error. The installation process is costly and labor intensive, at least because the installer is required to both screw the valve onto the pipe but also must take extra time to inspect the pipe and valve assembly to ensure correct installation of the valve.

SUMMARY OF THE INVENTION

Certain exemplary aspects of the present disclosure include devices and methods which advantageously mitigate the risk of errors in installation of valves onto fluid pipes and which decrease the amount of time required for installation. The following presents a general summary of aspects of the present disclosure. This summary is not an extensive overview of the disclosure and is not intended to identify key or critical elements of the invention or to delineate the scope of the present disclosure. The following summary merely presents some concepts of the present disclosure in a general form as a prelude to the more detailed description provided below.

According to one aspect of the present disclosure, a valve assembly includes a body having a fluid inlet disposed on a first end of the body and a fluid outlet disposed on a second end of the body, the body housing a sealing ring, and the fluid outlet being configured to be in fluid connection with the fluid inlet. The valve assembly further includes a push-to-connect fitting which is integral to the body, the push-to-connect fitting being configured to connect to an end of a pipe, a stem configured to seal the body in a first position and configured to allow fluid to flow from the fluid inlet of the body to the fluid outlet in a second position; and a connector surrounding at least part of the push-to-connect fitting. The push-to-connect fitting, in conjunction with the sealing ring, is configured to communicate the fluid inlet with the end of the pipe. The push-to-connect fitting is configured to provide a seal between the fluid inlet and the end of the pipe.

According to a further aspect of the present disclosure, a method of manufacturing a valve includes the steps of forging a body, the body comprising a first end and at least one end segment; machining the body to form a fluid inlet at the first end of the body and a fluid outlet at a first end segment of the at least one end segment of the body, an inner segment, an inner wall, and an interior fluid channel defined by the first end and the at least one end segment; installing a sealing ring within the inner segment of the body; installing a push-to-connect fitting within the inner segment of the body such that the push-to-connect fitting is configured to secure to an end of a pipe; securing the push-to-connect fitting within the inner segment of the body by a crimp formed in the inner wall; and installing a tubular member within an inner diameter of the push-to-connect fitting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to the present disclosure. The various concepts introduced above and discussed in greater detail below may be implemented in any of numerous ways, as the described concepts are not limited to any particular manner of implementation.

At least one aspect of the present disclosure relates to a valve which includes an integrally formed push-to-connect fitting for securing the valve to a fluid service. Such an assembly allows for lower costs and ease of installing the valve to the fluid service.

Figure 1:
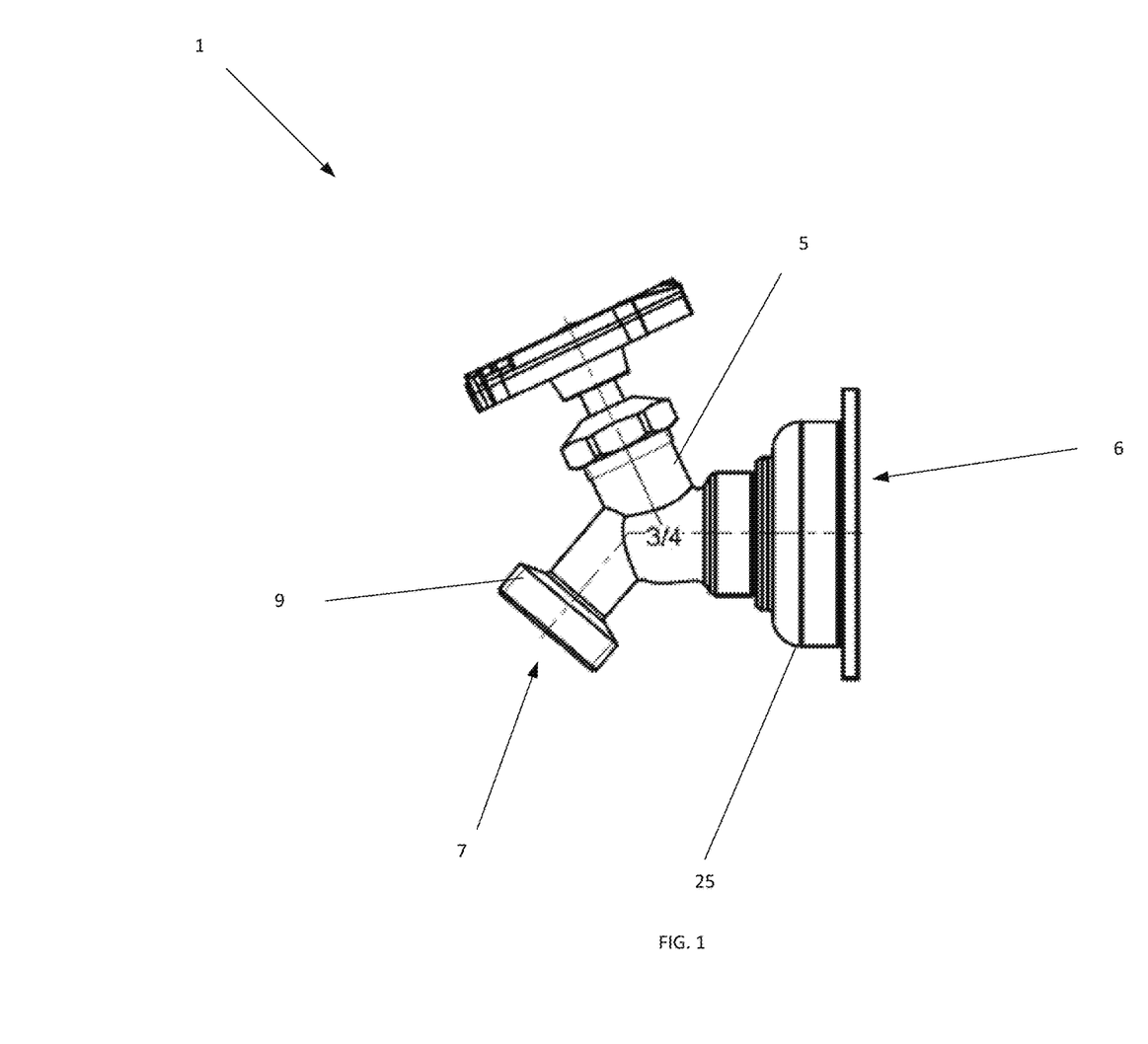
FIG. 1 is a side view of a sillcock, according to an exemplary implementation.
Figure 2:
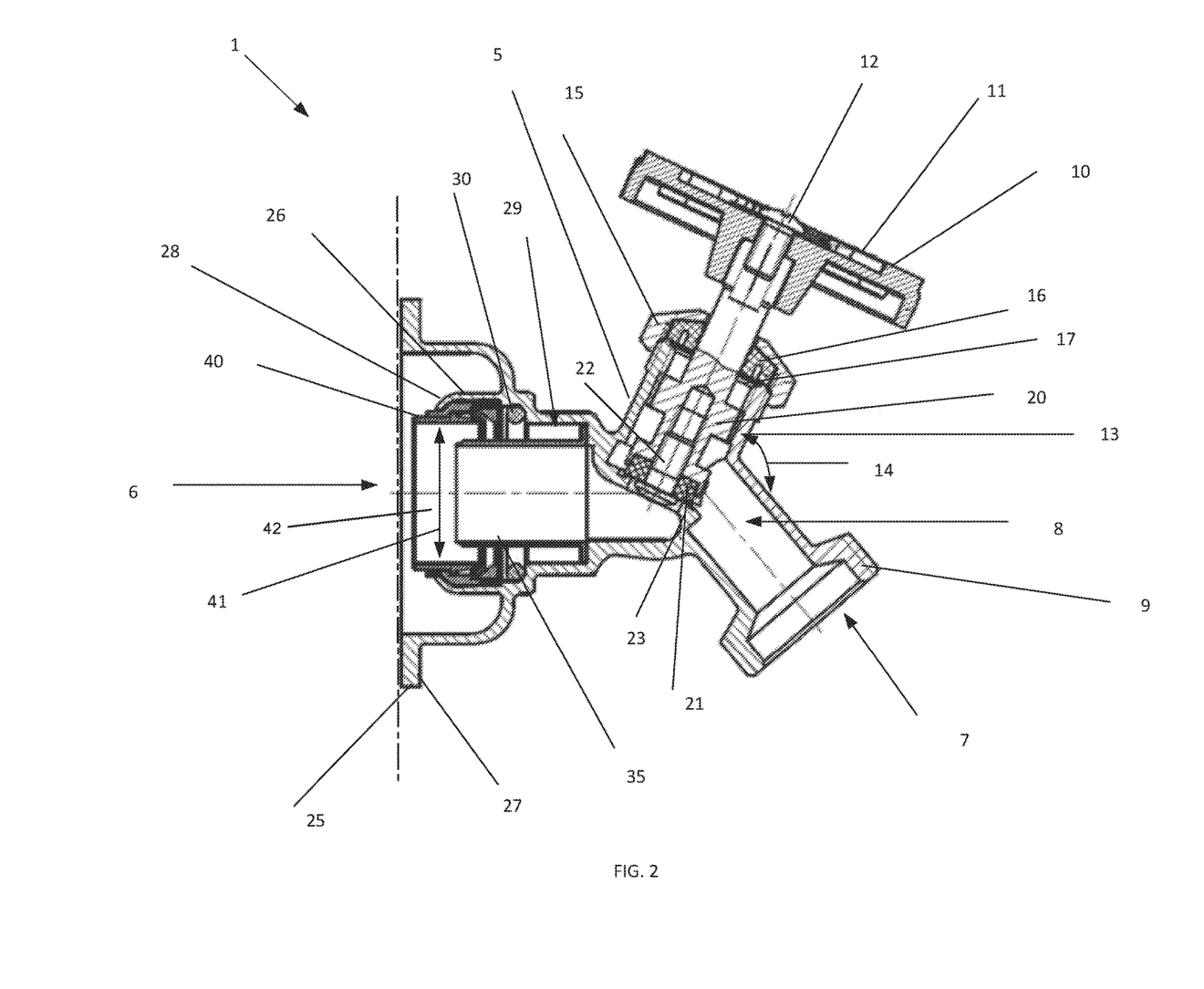
FIG. 2 is a side cross-sectional view of the sillcock shown in FIG. 1 in a first orientation.
Figure 3:
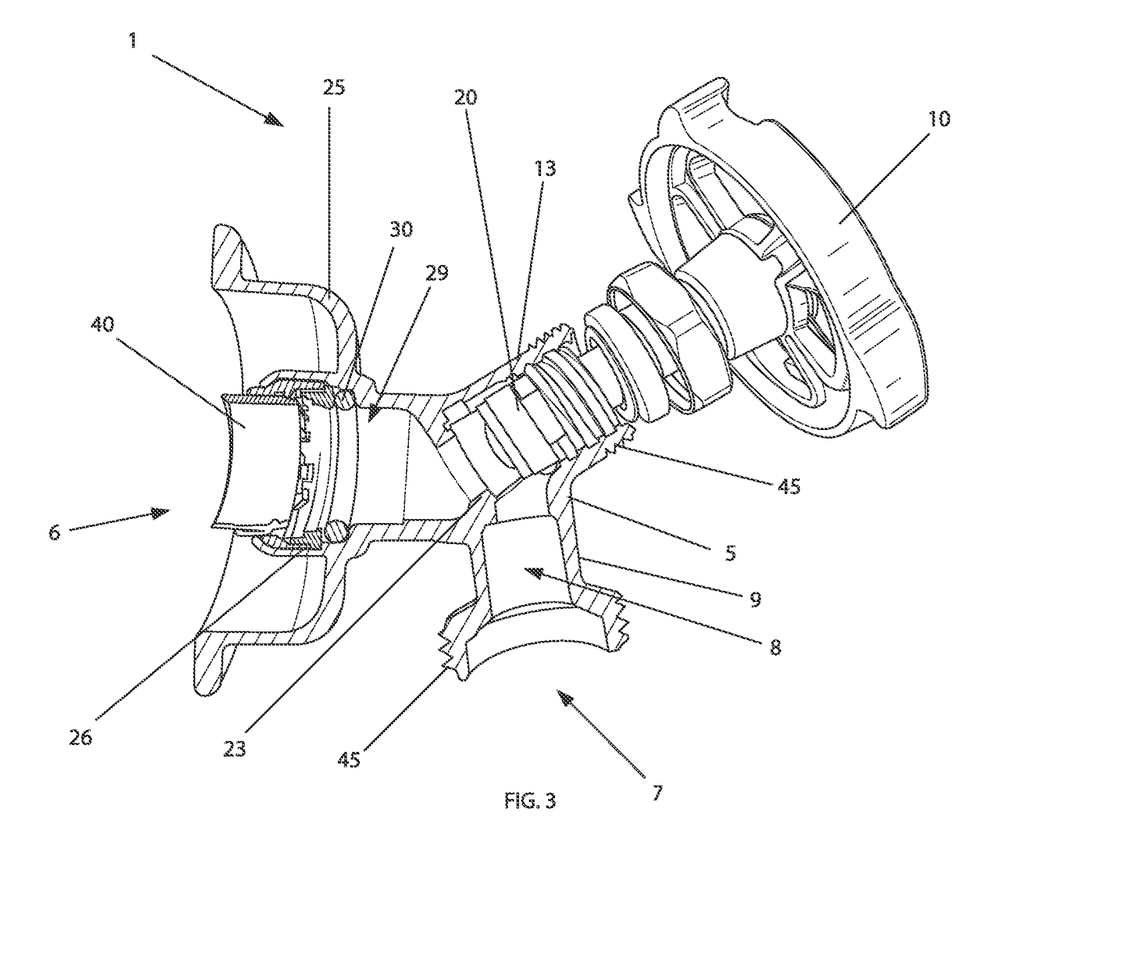
FIG. 3 is side cross-sectional view of a sillcock in a second orientation, according to an exemplary implementation.

Referring to FIGS. 1-3, according to an exemplary implementation of the present disclosure, a valve (e.g., sillcock, faucet, etc.) 1 includes a body 5. The body 5 includes a fluid inlet 6 disposed at a first end of the body 5 and configured to be fluidly connected to a fluid service (for example, an end of a pipe providing water). The body also includes a fluid outlet 7 disposed at a second end of the body 5 in fluid connection to the fluid inlet and configured to deliver a fluid to a user.

As shown in FIG. 2, the fluid inlet 6 and the fluid inlet 7 define a fluid channel (such as a fluid flow passageway) 8 disposed within and/or through an interior portion of the body 5. The body is formed of any suitable material (e.g., brass), and is formed by any suitable process, including forging and/or machining. Further, as shown in FIG. 2, the body 5 includes at least one end segment, such as end segment 13 and end segment 9. The end segment 13 and the end segment 9 are positioned relative to each other at any suitable relative orientation. For example, end segment 13 and end segment 9 are oriented relative to each other at an angle 14. The end segment 13 is configured to house a stopper (e.g., a stem) as described more fully below.

Figure 8:
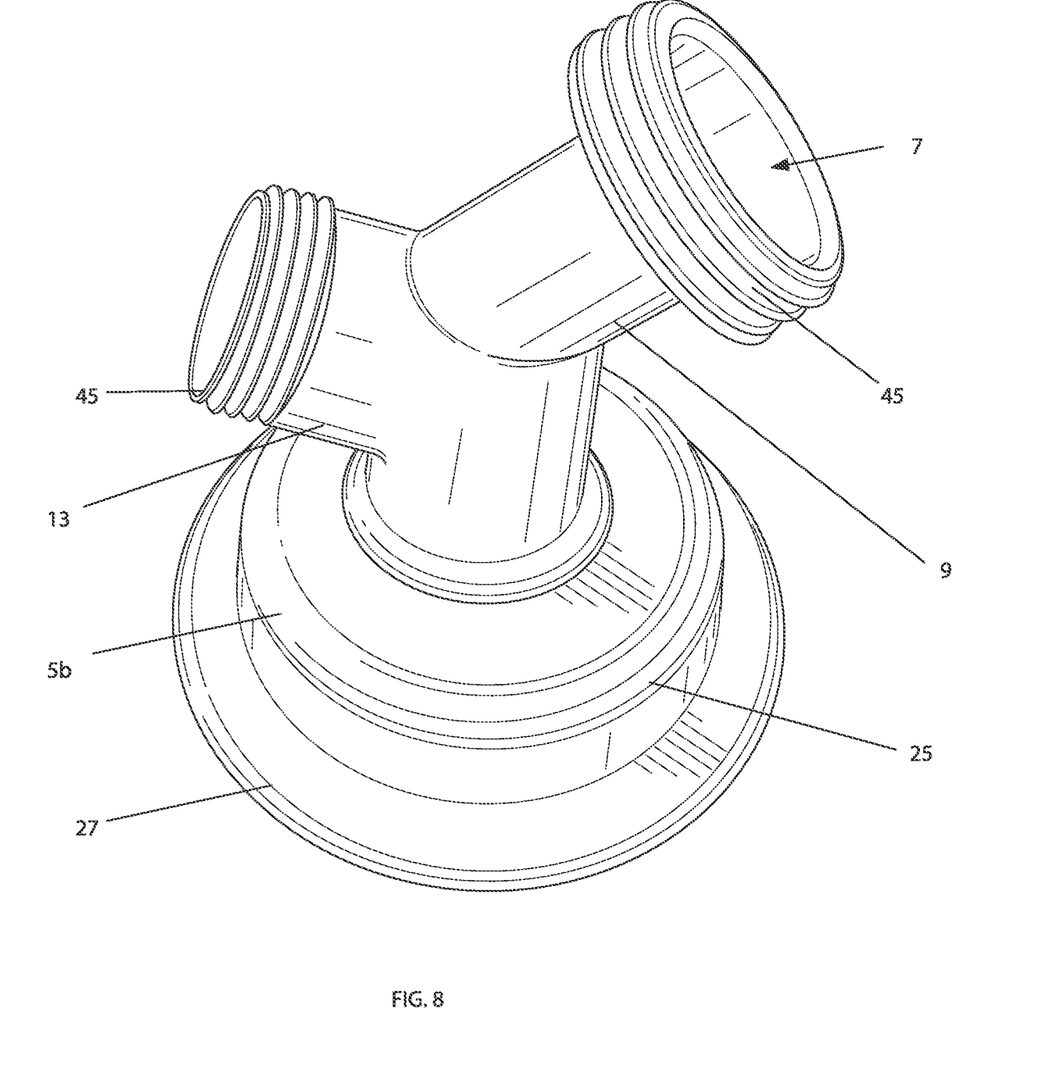
FIG. 8 shows a partially assembled valve according to another aspect of the method illustrated in FIG. 6.

End segment 9 (e.g., a nozzle) is fluidly connected to fluid channel 8 and includes the fluid outlet 7. End segment 9 is configured to allow a flow of fluid to a user. The end segment 9, according to one aspect, is configured such that a user may manipulate fluid flow delivered from fluid outlet 7 to a location other than the location of the body 5. For example, end segment 9 is configured such that a fluid flow device (e.g., a water hose) is securably attachable to the body 5. The end segment 9 may include threading 45, as shown in FIG. 8.

The body 5 also includes a lip 23 configured to house stopper 20 (which may also be referred to as a 'stem') as described more fully below. The body 5 also includes an inner segment 29, which is part of the fluid channel 8 disposed within an inner surface of the body 5 between the fluid 6 and the fluid outlet 7. The inner segment 29 is configured to receive a tubular member 35 (e.g., a tube liner) and a fitting 40 (such as a push-to-connect fitting), as described in more detail below.

The body 5 also includes a connector portion 25 formed integrally with the body 5 and disposed on an end of the body 5 corresponding with the fluid inlet 6 of the body 5. The connector portion 25 includes an inner wall 26 which defines at least a portion of the inner segment 29 of the body 5. The inner wall 26 includes a crimp 28 configured to secure the fitting 40 within the inner segment 29 of the body 5. As shown in FIG. 2, the crimp 28 is oriented in a direction toward the tubular member 35.

The connector portion 25 includes a lip 27 configured to be securably attachable to a structure located at an end of a pipe 42 (e.g., a wall of a building, represented by a dot-dash line in FIG. 2). The connector portion 25 surrounds at least part of the fitting 40, as described below. The connector portion 25 is configured, according to one example, to interface with an end of a pipe. According to one aspect, the connector portion 25 extends over and around a circumferential portion of the fitting 40, as shown in FIG. 2.

As mentioned above, valve 1 also includes a stopper (e.g., stem) 20. The stopper 20 is configured to seal the body 5 when the stopper 20 is in a first position (as shown in FIG. 2). FIG. 3 depicts a sillcock similar to that shown in FIG. 1, in which a stopper 20 is configured to allow fluid to flow through the inner channel 8 from the fluid inlet 6 to the fluid outlet 7 when the stopper 20 is in a second position. The stopper 20 is housed within an inner surface of the end segment 13 of the body 5. The stopper 20 is fluidly sealed within the end segment 13 of the body 5 at one end using a washer 21, which is secured to an end of the stopper 20 by a fastener (e.g., screw) 22.

The stopper 20 is fluidly sealed within the end segment 13 of the body 5 at another end using a washer 16 and a gasket 17 which are secured in place at an end of the end segment 13 by a packing nut 15 which is securably attachable to the threads 45 of the end segment 13. The stopper 20 is connected to a handle 10 (such as the wheel handle shown in FIGS. 1-3), which is securably attachable to the stopper 20 using a fastener (e.g., a screw) 12. Handle 10 also includes portion 11 which is configured to house a nameplate.

The valve 1 also includes fitting 40 which is integrated with the body 5. According to one example, fitting 40 is a push-to-connect fitting configured to allow for ease of installing the valve 1 onto an end of a pipe. Fitting 40 includes an inner diameter 41 configured to allow the fitting 40 to communicate the fluid inlet 6 of the body 5 with the end of the pipe. Fitting 40 is securably held in place within the connector portion 25 of the body 5 by the crimp 28 of the inner wall 26 of the body 5, such that the fitting 40 is integral to the body 5 of the valve 1. The fitting 40 is configured to provide a grip on the end of the pipe to secure the body 5 to the end of the pipe (e.g., at installation).

A tubular member (e.g., tube liner) 35 may optionally be disposed within the inner diameter 41 of the fitting 40 and also within the inner segment 29 of the body 5. The tubular member 35 may be provided in consideration of the mechanical strength of the type of pipe being connected. The tubular member 35 is configured to communicate with the end of the pipe and the fluid channel 8.

A sealing ring (e.g., O-ring) 30 is disposed within the inner segment 29 of the body 5. The sealing ring 30 is configured to fluidly seal the end of the pipe with the body 5, thereby allowing a fluid flow from the connected pipe to the fluid outlet 7 of the body 5. The fitting 40 grips the pipe and prevents the sealing ring 30 from extruding. The fitting 40 eliminates the requirement for a threaded joint to be employed and therefore mitigates the likelihood of a leak path being established.

Figure 4:
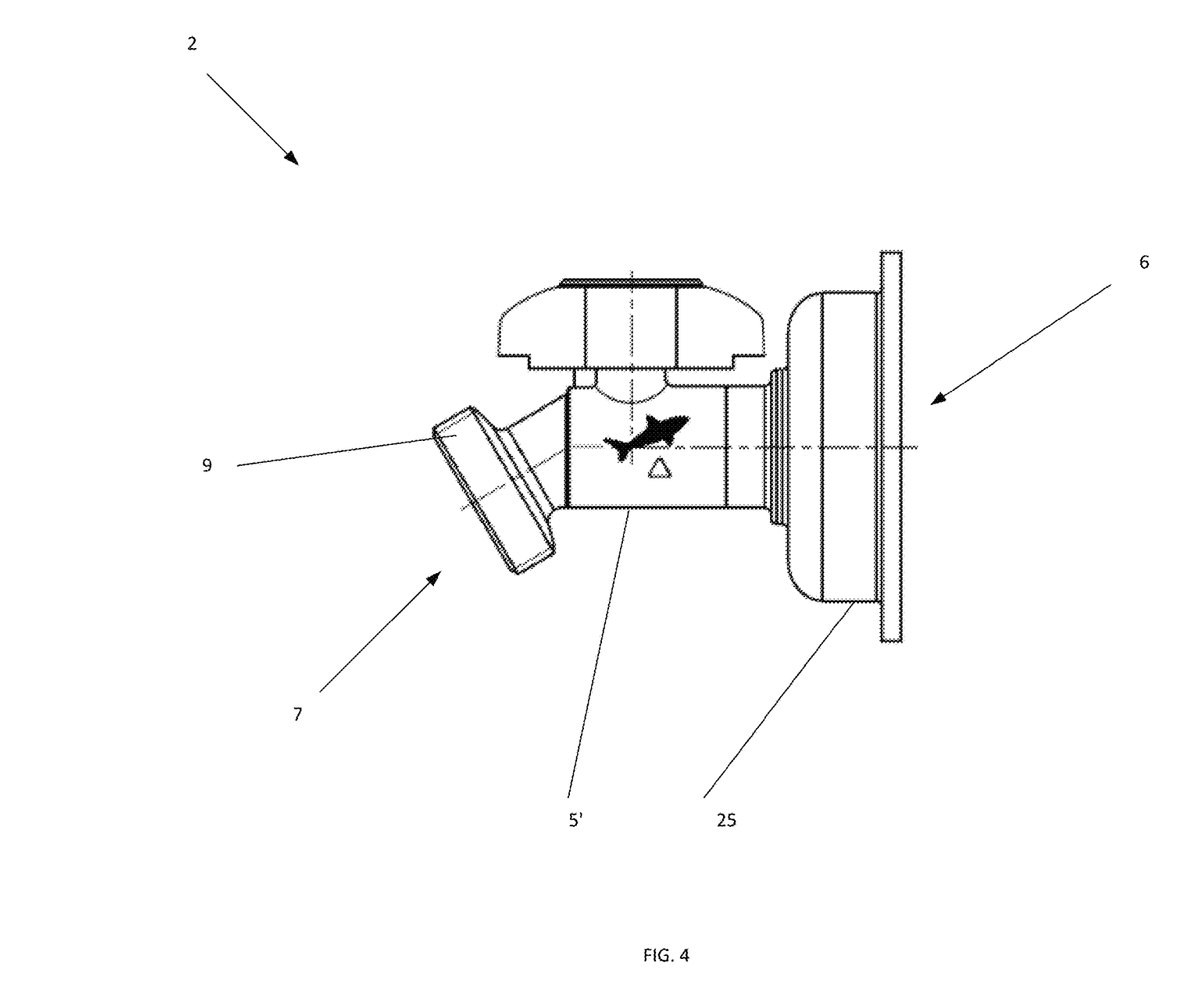
FIG. 4 is a side view of a sillcock, according to an exemplary implementation.
Figure 5:
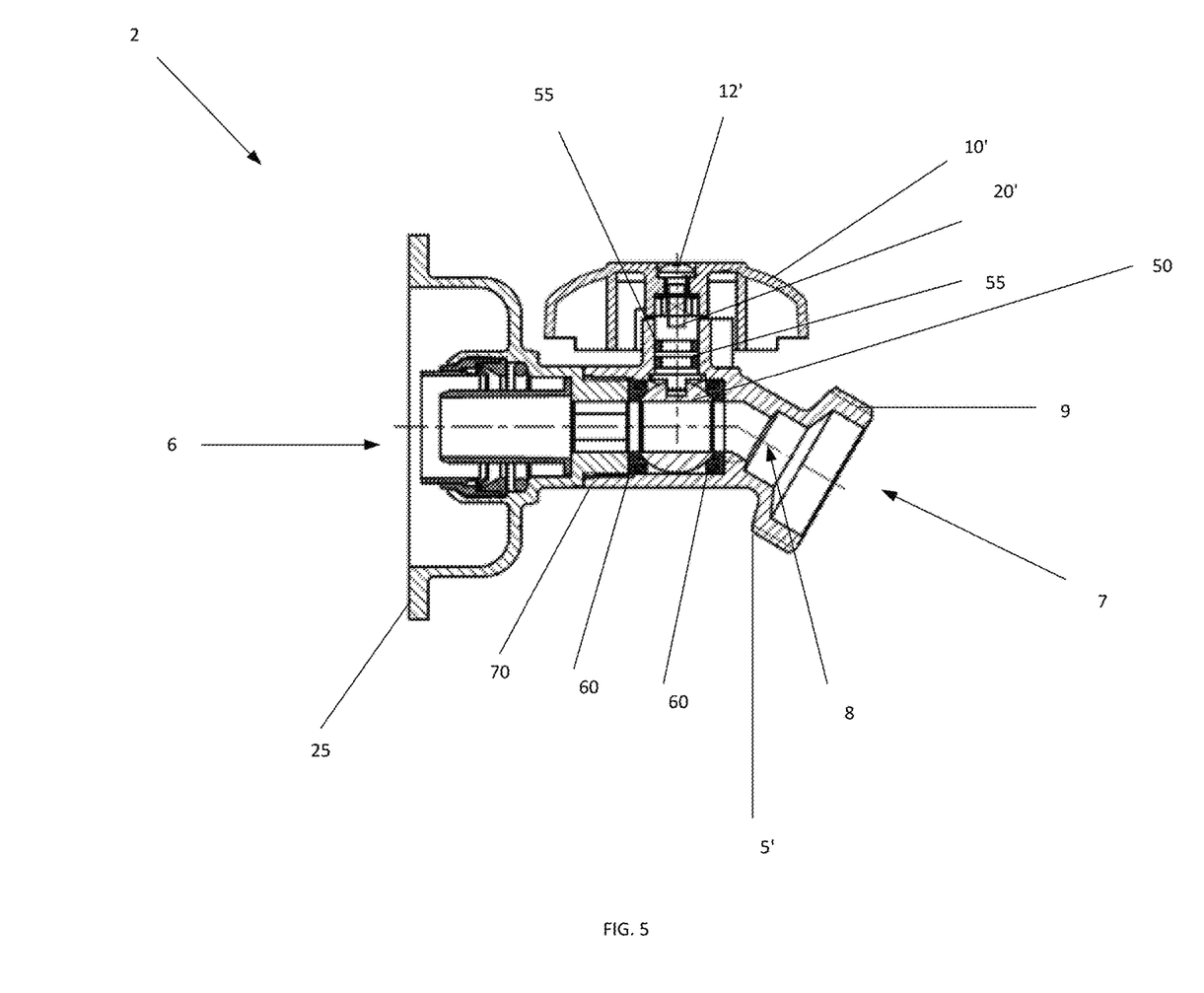
FIG. 5 is a side cross-sectional view of the sillcock shown in FIG. 4.

As shown in FIGS. 4-5, according to an exemplary implementation of the present disclosure, a valve (e.g., sillcock or faucet valve) 2 is provided. The valve 2 may include certain components present in valve 1, discussed above. Valve 2 includes a body 5', and the body 5' of valve 2 comprises a bonnet 70 configured to overlap and/or connect with the connector portion 25 of the valve 2. Bonnet 70 is configured to fluidly seal fluid channel 8 of the body 5' such that fluid flow through the connector portion 25 does not leak as the fluid flows to the fluid outlet 7 of the body 5'.

The valve 2 includes a stopper (e.g., stem) 20' configured to seal the body 5 when the stopper 20' is in a first position and configured to allow fluid to flow through the inner channel 8 from the fluid inlet 6 to the fluid outlet 7 when the stopper 20' is in a second position. The stopper 20 includes a ball portion 50 which is configured to be rotatable from the first position to the second position. In this manner, the body 5' is sealed when the ball portion 50 is in the first position and the body 5' is configured to receive a fluid flow therein when the ball portion 50 is in the second position.

The stopper 20' is fluidly sealed within the body 5' by one or more sealing rings (e.g., O-rings) 55; for example, two sealing rings 55 are shown in FIG. 5. The ball portion 50 of the stopper 20' is fluidly sealed within the fluid channel 8 by one or more sealing rings 60; for example, two sealing rings 60 are shown in FIG. 5. The two sealing rings 60 are parallel to and spaced apart from each other. The stopper 20' is connected to a handle 10' (for example, a wing handle) using a fastener (e.g., screw) 12'.

Figure 6:
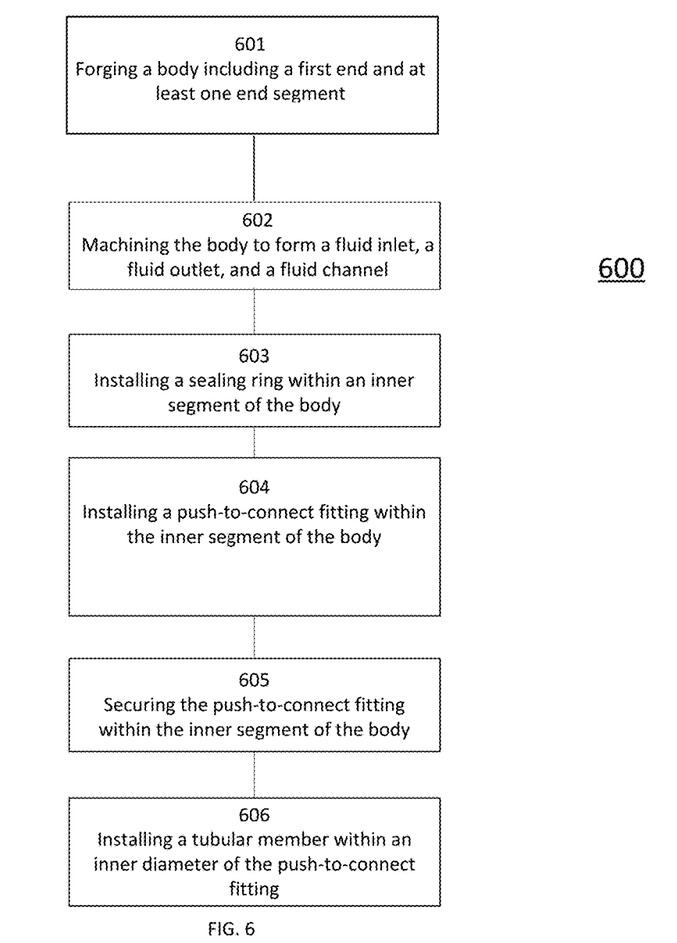
FIG. 6 is a process diagram illustrating a method of assembling a valve, according to an exemplary implementation.
Figure 7:
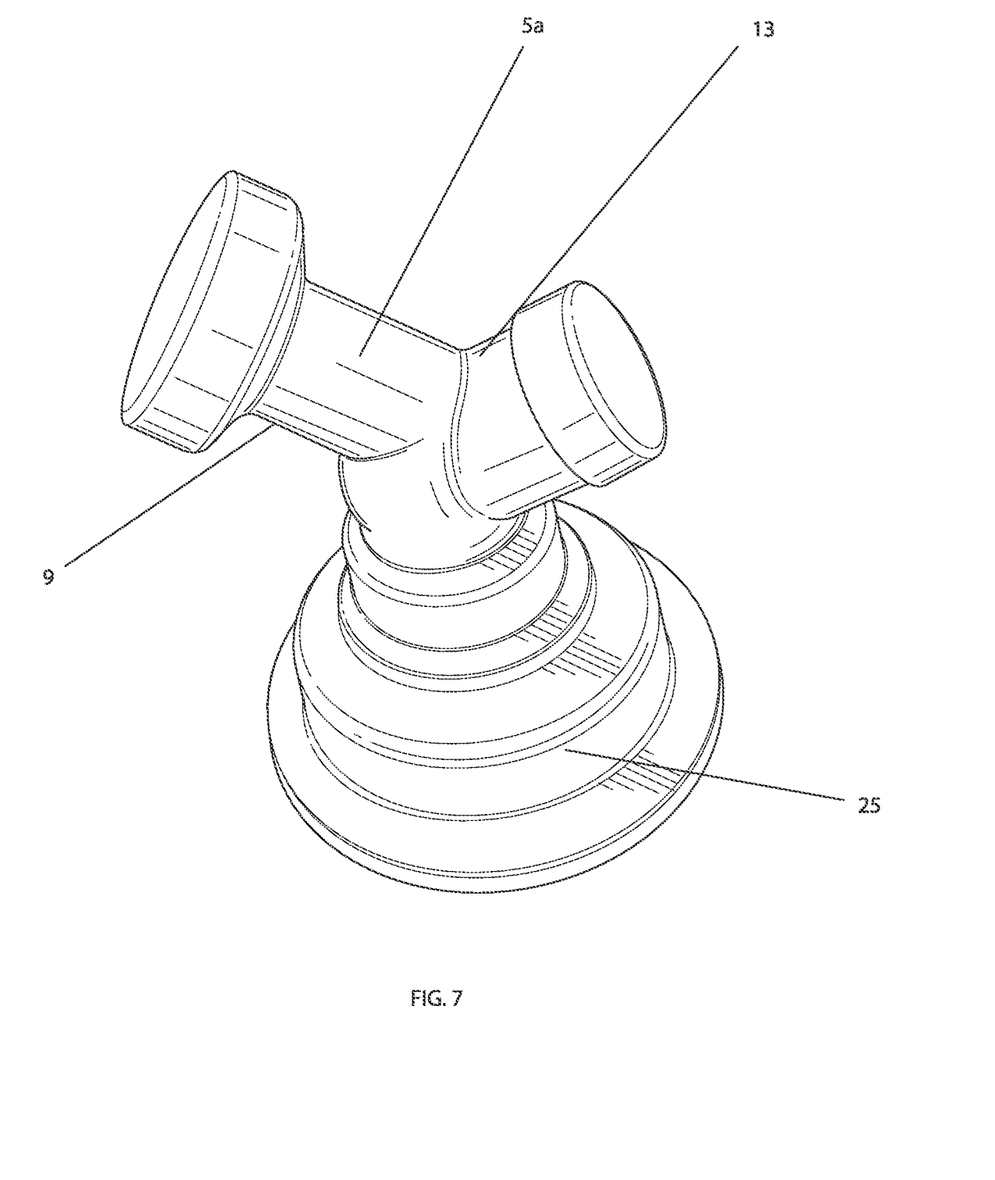
FIG. 7 shows a partially assembled valve according to one aspect of the method illustrated in FIG. 6.

FIG. 6 depicts a method 600 for manufacturing a valve according to an exemplary implementation of the present disclosure. The method 600 includes forging a body (step 601), the body comprising a first end and at least one end segment. As shown in FIG. 7, a rough forged body 5a of the valve is shown. The body may be formed in a single forging step, as opposed to a multi-step process.

Referring back to FIG. 6, the method 600 also includes machining the body to form a fluid inlet at the first end of the body, a fluid outlet at a first end segment, an inner segment 29, an inner wall 26, and an interior fluid channel defined by the first end and the at least one end segment (step 602). FIG. 8 depicts the machined body 5b according to an exemplary implementation. According to one aspect of the method 600, machining the body includes threading at least one end of the body 5b with threads 45 which allow a user to connect a fluid device (e.g., a hose) to the finished body of the valve to deliver fluid to a desired location.

The method 600 also includes installing a sealing ring (e.g., O-ring) within an inner segment of the body (step 603). The method 600 further includes installing a push-to-connect fitting within the inner segment of the body such that the push-to-connect fitting can secure itself to an inserted end of pipe at installation (604). The method 600 includes securing the push-to-connect fitting within the inner segment of the body by the crimp 28 formed in the inner wall 26 (step 605). The method 600 includes installing a tubular member 35 within an inner diameter of the push-to-connect fitting (step 606).

In at least one implementation, a method for assembling the end of the pipe with the push-to-connect fitting 40 is as follows. First, the end of the pipe is cut evenly, so as to ensure that the ends are square. Deburring or other finishing processes may be carried out to avoid leaving any rough edges that may damage components such as the sealing rings. Next, the depth is marked for accuracy, and the end of the pipe is then inserted through the push-to-connect fitting 40. Disassembly may be carried out by placing a disassembly clip around the exposed portion of the push-to-connect fitting 40, pushing the clip against the fitting, and pulling the end of the pipe with a twisting motion.

As utilized herein, the terms "approximately," "about," "substantially," and similar terms are intended to have a broad meaning in harmony with the common and accepted usage by those of ordinary skill in the art to which the subject matter of the disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

The terms "coupled," "connected," and the like are used herein to mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the Figures. It should be noted that the orientation of various elements may differ according to other exemplary implementations and that such variations are intended to be encompassed by the present disclosure.

It is to be understood that although the present invention has been described with regard to implementations thereof, various other implementations and variants may occur to those skilled in the art, which are within the scope and spirit of the invention, and such other implementations and variants are intended to be covered by corresponding claims. Those skilled in the art will readily appreciate that many modifications are possible (e.g., variations in sizes, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative implementations. Other substitutions, modifications, changes, and omissions may also be made in the design, operating conditions and arrangement of the various exemplary implementations without departing from the scope of the present disclosure.

With respect to the use of substantially any plural and/or singular terms herein, those having skill in the art can translate from the plural to the singular and/or from the singular to the plural as is appropriate to the context or application. The various singular/plural permutations may be expressly set forth herein for clarity.

What is claimed is:

1. A method of manufacturing a valve, the method comprising:
    forging a body comprising a first end and at least one end segment, the first end of the body including a connector portion comprising an outer peripheral wall and configured to couple to a structure so as to secure at least the first end of the body in place;
    machining the body to form a fluid inlet at the first end of the body, a fluid outlet at a first end segment of the at least one end segment of the body, an inner segment, an inner wall, and an interior fluid channel defined by the first end and the at least one end segment;
    installing a sealing ring within the inner segment of the body;
    installing a push-to-connect fitting within the inner segment of the body such that the push-to-connect fitting is integrated with the body and configured to secure to an end of a pipe, the connector portion extending over a top of and around a circumferential portion of the push-to-connect fitting;
    securing the push-to-connect fitting within the inner segment of the body by a crimped end formed in the inner wall, wherein the outer peripheral wall extends continuously from and is integral with the inner wall, wherein the outer peripheral wall extends at least partly around the crimped end of the inner wall; and
    installing a tubular member within an inner diameter of the push-to-connect fitting, the tubular member being in communication with the pipe.

2. The method according to claim 1, wherein the connector portion of the body is configured to be coupled to the end of the pipe.

3. The method according to claim 1, wherein the connector portion comprises a lip portion along the first end of the body, wherein the lip portion is configured to be securably attachable to the structure and extends radially outwardly from the outer peripheral wall.

4. The method according to claim 1, wherein the at least one segment comprises a tubular section.

5. The method according to claim 1, wherein the at least one segment comprises the first end segment and a second end segment, the first and second end segments oriented at a predetermined angle relative to each other.

6. The method according to claim 1, wherein the machining the body comprises threading an end of the at least one end segment of the body.

7. The method according to claim 1, wherein the sealing ring is an o-ring.

8. The method according to claim 1, wherein the securing the push-to-connect fitting within the inner segment of the body comprises crimping an end of the inner segment around an end of the push-to-connect fitting to form the crimped end.

9. The method according to claim 1, wherein a second end segment of the body is configured to receive a stopper configured to allow fluid flow through the interior fluid channel of the body when the stopper is in a first position and prevent fluid flow through the interior fluid channel of the body when the stopper is in a second position.

10. The method according to claim 9, wherein the body comprises an inner lip portion configured to receive an end of the stopper when the stopper is in the second position.

\* \* \* \* \*